J. R. Haworth & J. L. Wilson's Ditching Plow.

No. 73858

PATENTED JAN 28 1868

Witnesses: Jno. A. Ellis, Jno. White

Inventor: J. R. Haworth, J. L. Wilson

J. H. Alexander & Co. Attys

United States Patent Office.

J. L. WILSON AND J. R. HAWORTH, OF IOWA FALLS, IOWA.

Letters Patent No. 73,858, dated January 28, 1868.

IMPROVEMENT IN DITCHING-PLOUGHS.

The Schedule referred to in these Letters Patent and making part of the same.

TO ALL WHOM IT MAY CONCERN:

Be it known that we, J. L. WILSON and J. R. HAWORTH, of Iowa Falls, in the county of Hardin, and State of Iowa, have invented certain new and useful Improvements in Ditching-Ploughs; and we do hereby declare that the following is a full, clear, and exact description thereof, reference being had to the accompanying drawings, and to the letters of reference marked thereon, which form a part of this specification. In the annexed drawings, which make a part of this specification—

Figure 1:
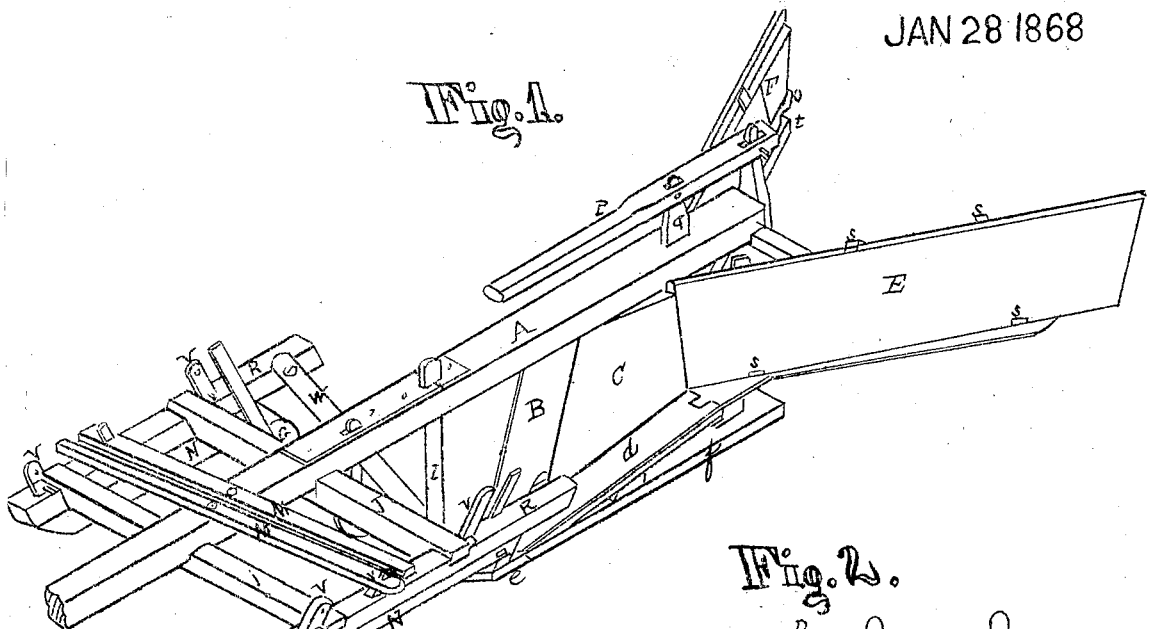
Figure 1 represents our machine in perspective.
Figure 2:
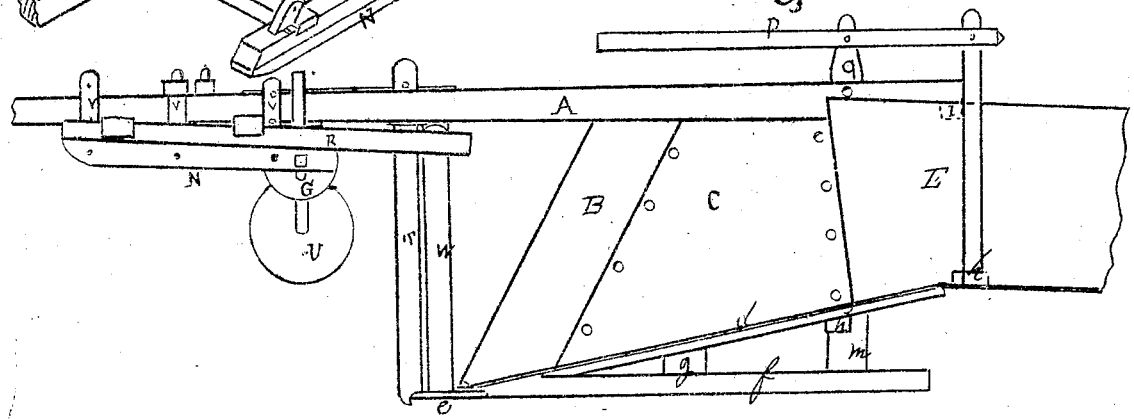
Figure 2 is a side elevation of the same.

The letter A designates the beam of our ditcher. B is the coulter, which is placed immediately in front of and fastened to the block C. On each side of the said coulter and block is the mould-board d. The mould-boards d are placed at a slight angle, and rest, at their lower ends, on the shovel e, the upper end extending a little beyond the rear of block C. To afford a proper support for the mould-boards, the ground-piece f is provided, the front end of said ground-piece being made to rest on shovel e. Midway of the ground-piece f is adjusted the block g, which supports the mould-boards d at their centre, the rear ends of said mould-boards being supported by the cross-bar u, which is mortised through an upright, m, the said upright being fastened at bottom to the ground-piece f, and at top to the beam A. E E represent two supplemental mould-boards, designed to throw the earth off from the furrow made by the ditcher, after the earth has been conveyed to the surface by the mould-boards d. The mould-boards E are bound together by two cross-ties, h and i, shown in red lines in fig. 2, and are rendered adjustable in the following-described manner: On the inner side of each mould-board E is adjusted the supplemental board F, which is about two-thirds the width of the mould-boards E. The boards F are kept in position by three metal straps, s, fastened to the bottom of the mould-boards E, the middle strap s being also bent over and secured to the top of the mould-board. The said metal straps are let into the board F, and kept in place by a sheet of metal, nailed over them lengthwise of said boards. The mould-boards E have a projecting rim or shoulder, t, at bottom, and between this shoulder and the lower edge of board F, the wedge o is inserted when it is desired to raise up the mould-boards E. As a further means of elevating said mould-boards, the lever P is provided, which acts on the cross-bar h, by which the two mould-boards E are bound together. The lever P has its fulcrum on q. At the front end of shovel e, the coulter T is adjusted. The coulter T occupies a vertical position, and, having passed through the beam A, is secured by a key. Running nearly parallel with beam A are the bars R R, which are secured to said beam by the cross-ties j j. Underneath each bar R is placed the adjustable gauge-bar N, which is attached to bar R by means of slides V. The gauge-bars N are operated by levers M, each lever acting on a separate bar, so that if the ground should be higher on one side of the furrow than on the other, the gauge-bar can be elevated on that side, and thus adapt the machine to the inequalities of the ground. In order to prevent the friction which would be occasioned by the gauge-bars N resting on the earth, the wheels G are provided, the said wheels being made adjustable by being attached to pendants, which work in a groove cut in the side of bars R. U represents a larger wheel, which is attached to a pendant directly in front of coulter T, the said pendant being adjustable. The wheel U is designed to regulate the depth of the shovel e. W W represent two braces, extending from the bars R to the shovel e.

It will be observed that in operating our machine, the mould-boards d will convey the loose earth to the surface, where it will be carried out of the way by the supplemental mould-boards E.

Having thus described our invention, what we claim, and desire to secure by Letters Patent, is—

1. The beams R R, the gauge-beams N N, and wheels C, when combined and constructed as set forth.
2. The levers M M, constructed and operating in the manner specified.
3. The mould-boards d, the supplemental mould-boards E, in combination with lever P, the whole constructed and operating substantially as set forth.
4. The wheel U, in combination with coulter T and shovel e, when arranged and operating substantially as described.

In testimony that we claim the foregoing as our own, we affix our signatures in presence of two witnesses.

J. L. WILSON,
J. R. HAWORTH.

Witnesses:
O. W. GARRISON,
L. PERKINS.